United States Patent
Moses et al.

(10) Patent No.: US 10,437,448 B2
(45) Date of Patent: Oct. 8, 2019

(54) SYSTEM AND METHOD FOR AUTO-CONFIGURATION OF DEVICES IN BUILDING INFORMATION MODEL

(71) Applicant: Honeywell International Inc., Morristown, NJ (US)

(72) Inventors: Satheesh Babu Moses, Tamilnadu (IN); Viswanathan Chatapuram Krishnan, Tamil Nadu (IN); Dharmalingam Vediappan, Tamil Nadu (IN); Vinay Venkatesh, Karnataka (IN)

(73) Assignee: Honeywell International Inc., Morris Plains, NJ (US)

(*) Notice: Subject to any disclaimer, the term of this patent is extended or adjusted under 35 U.S.C. 154(b) by 240 days.

(21) Appl. No.: 14/325,450

(22) Filed: Jul. 8, 2014

(65) Prior Publication Data
US 2016/0011751 A1  Jan. 14, 2016

(51) Int. Cl.
| | | |
|---|---|---|
| *G06F 3/0484* | (2013.01) | |
| *G06F 3/0481* | (2013.01) | |
| *G06F 3/0482* | (2013.01) | |
| *G06F 3/0486* | (2013.01) | |
| *G08B 13/196* | (2006.01) | |
| *G08B 25/14* | (2006.01) | |
| *G08B 25/00* | (2006.01) | |

(52) U.S. Cl.
CPC ........ *G06F 3/04847* (2013.01); *G06F 3/0482* (2013.01); *G06F 3/0486* (2013.01); *G06F 3/04817* (2013.01); *G06F 3/04842* (2013.01); *G08B 13/19682* (2013.01); *G08B 25/14* (2013.01); *G08B 25/003* (2013.01)

(58) Field of Classification Search
CPC ............... G06F 3/0486; G06F 3/04847; G06F 3/04817; G06F 3/0482; G06F 3/04842
USPC ........................................................ 715/769
See application file for complete search history.

(56) References Cited

U.S. PATENT DOCUMENTS

| | | | |
|---|---|---|---|
| 5,189,394 A | 2/1993 | Walter et al. | |
| 5,650,800 A | 7/1997 | Benson | |
| 6,229,429 B1* | 5/2001 | Horon | G08B 25/14 340/286.01 |

(Continued)

OTHER PUBLICATIONS

Extended European search report for corresponding EP patent application 15171998.6, dated Mar. 16, 2016.

*Primary Examiner* — Roland J Casillas
(74) *Attorney, Agent, or Firm* — Seager, Tufte & Wickhem LLP

(57) ABSTRACT

A security system that creates a display using a set of steps including a user input of a security system having a secured area receiving a respective name from the user for each of a plurality of security sensors, a processor matching each of the respective names to one of a plurality of respective names of sensor locations within a Building Information Model (BIM) of the secured area, the user input receiving from the user a specific designation of a corresponding location of each of the plurality of security sensors within a geographic coordinate system of the BIM, a processor of the security system correlating each of the respective names with the corresponding location of the security sensor within the BIM and a processor of the security system mapping each of the plurality of security sensors to a location within the BIM model based upon the name of the device.

16 Claims, 2 Drawing Sheets

(56) References Cited

U.S. PATENT DOCUMENTS

| | | | | |
|---|---|---|---|---|
| 2010/0114383 A1* | 5/2010 | Rosca | ............... | H04L 67/12 |
| | | | | 700/276 |
| 2012/0194336 A1* | 8/2012 | Thiruvengada | .. | G08B 13/19645 |
| | | | | 340/525 |
| 2013/0091432 A1* | 4/2013 | Shet | ............ | G08B 13/19645 |
| | | | | 715/719 |

* cited by examiner

SYSTEM AND METHOD FOR AUTO-CONFIGURATION OF DEVICES IN BUILDING INFORMATION MODEL

FIELD

This application is directed to security systems and more particularly to methods of setting up security systems.

BACKGROUND

Systems are known to detect threats within secured areas. In this regard, one or more sensors of a security system may be provided within the secured area to detect any of number of different types of events that could represent a risk to the safety and/or security of humans or assets within the secured area.

For example, fire sensors may be distributed throughout the area. The fire sensors may be coupled to a local audible alarm that alerts occupants to the risk of fire.

Similarly, limit switches may be provided on the doors and windows providing access into the secured area in order to detect unauthorized entry into the secured area. As above, the limit switches may be coupled to a local audible alarm.

In order to mitigate the damage from fire or intruders, the sensors may be monitored by a local control panel. Upon activation of one of the sensors, the control panel may send an alarm message to a central monitoring station.

While security systems work well, they are often difficult to install and set up. One recent advance that has reduced the cost of installation is the development of wireless sensors. The use of wireless devices has dramatically reduced to cost of installation because it is no longer necessary to install wires between the control panel and each of the devices.

Wireless sensors rely upon the presence of a wireless transceiver in both the control panel and each of the sensors and annunciators. In many cases, the sensors are battery powered.

While the use of wireless sensors has reduced the cost of installation, such costs can still be significant in large installations (e.g., factories, office buildings, condominiums, etc.). Accordingly, a need exists for better methods of automating the installation of wireless sensors.

DETAILED DESCRIPTION

Figure 1:
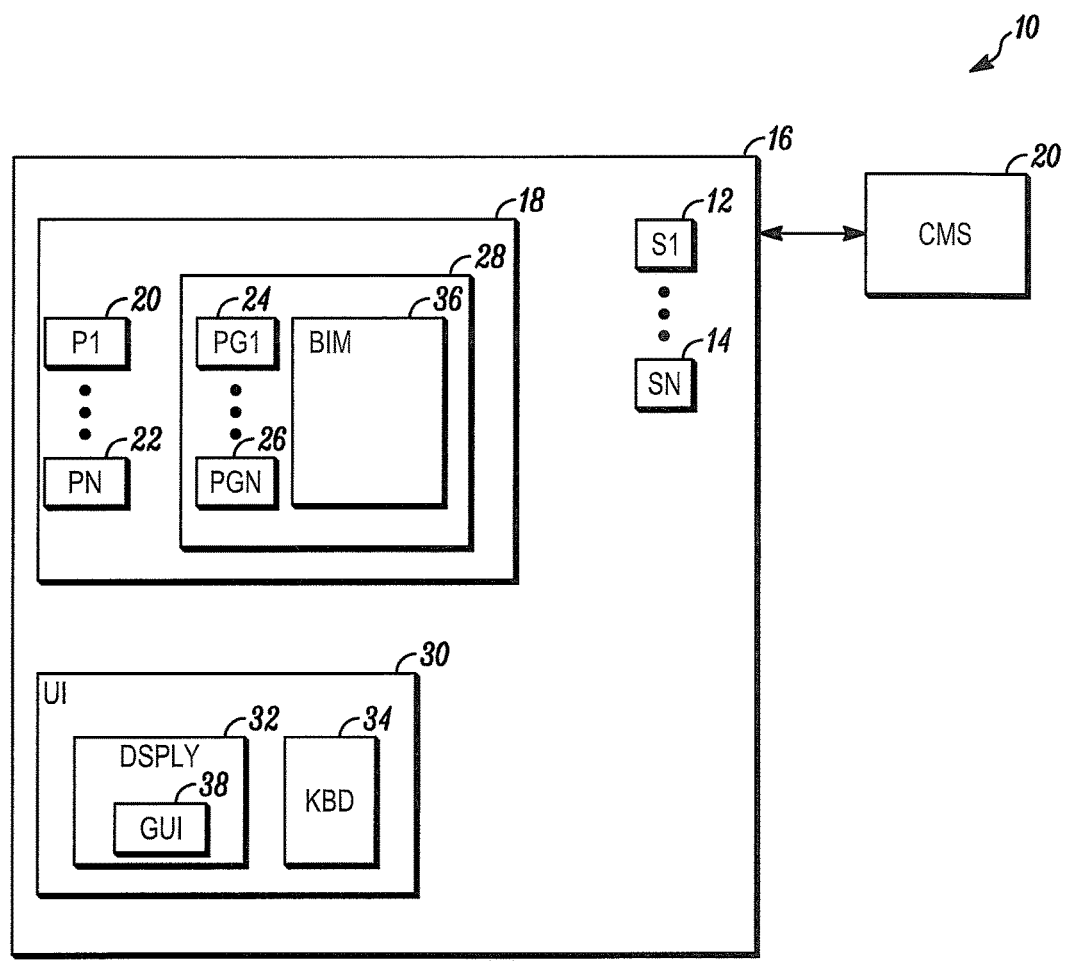
FIG. 1 illustrates a block diagram of a security system shown generally in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a security system 10 shown generally in accordance with an illustrated embodiment. Included within the security system is a number of sensors 12, 14 that detect threats within a secured area 16.

The sensors may be wired or wireless devices intended to detect any of a number of different threats to the safety and/or security of humans and/or assets. For example, some of the sensors may be fire detection devices (e.g., smoke detectors, carbon monoxide detectors, etc.). Others may be intrusion detection devices (e.g., limit switches on doors and windows, passive infrared (PIR) detectors, etc.).

The status of the sensors may be monitored by a control panel 18 located within the secured area as shown in FIG. 1 or located remotely. Upon activation of one of the sensors, the control panel may send an alarm message to a central monitoring station 20. The central monitoring station may response by summoning the appropriate help (e.g., police, fire, etc.).

Included within the control panel is control circuitry that monitors the sensors. The control circuitry may include one or more processor apparatus (processors) 20, 22 each operating under control of one or more computer programs 24, 26 loaded from a non-transitory computer readable medium (memory) 28. As used herein, reference to a step performed by a computer program is also reference to the processor that executed that step.

Included within the control panel may be an alarm processor that monitors a status of each of the sensors. Upon detection activation of one of the sensors, the alarm message may compose and send a message to the central monitoring station including an address or account number of the secured area, an identifier of the type of sensor and its location and a time.

A user interface 30 may also be provided for control of the security system. The user interface may include a display 32 for displaying information about the security system and a key board 34 for the input of instructions by an authorized user. For example, the user may activate (i.e., arm) certain geographic zones or deactivate other zones.

Upon detection of activation by the control panel of one of the sensors, an alert may be shown on the display. The alert may include a map of the secured area along with an icon of the activated sensor shown on the map.

Under one illustrated embodiment, a Building Information Model (BIM) 36 may be used to simplify and enhance the display of alarm information within the security system. The BIM may be embodied as a file of location information. Included within the BIM is a set of geographic coordinates that define the secured area and any building thereon. In the case of buildings, the BIM defines the three-dimensional coordinates of each of the floors including any walls, stairs and points of egress in the form of one or more floor plans. The BIM may also include coordinates defining any rooms on each floor.

The BIM also includes textual information explaining the relationships and use of various areas within any buildings. For example, the BIM may superimpose the word lobby over a lobby or reception area. Similarly, the BIM may include the words "Fire Exit" adjacent any fire exits. The BIM may also include floor designations (e.g., first floor, second floor, basement, etc.). Regions may also be identified within the BIM (e.g., north wing, north wind of first floor, etc.).

Under the illustrated embodiment, the information of the sensors 12, 14 is automatically incorporated into the BIM. Incorporating the information of each of the sensors into the BIM allows the sensors to be superimposed over maps of the secured area. For example, a respective icon for each of the sensors may be display on a floor plan at the installed location of the sensor. Upon activation of the sensor, the icon may be caused to flash or otherwise assume an indication of activation.

Selection of an icon on a floor plan may be used to retrieve and display information about the sensor. Displayed information may include a make and model of the sensor as well as a system address and status of the sensor.

Under the illustrated embodiment, sensor information may be incorporated into the BIM using an automated process have first and second parts. Under the first part, a correlation processor may form a correlation between geographical information of the BIM and of the sensors. The correlation processor may retrieve descriptive information from each of the sensors. An intelligent algorithm executing on a classification processor may classify each of the sensor devices based upon a name of the device configured or otherwise provided by the user.

Once the devices have been classified, the same or a different Natural Language Processor (NLP) processor may process the names to identify geographic indicators (e.g., first floor, second floor, etc.) and also functional words (e.g., fire exit, lobby, cafeteria, reception, etc.).

It should be noted in this regard that the BIM will have information on the number of the floors and areas present in the building. Most common names are based on the floor or direction (e.g., first-north, second-west, etc.).

Next, the names of the devices are logically mapped or otherwise correlated with the names of the regions or areas derived from the BIM file by another processor. Mapping in this case means grouping names in a hierarchical order. The grouping may mean grouping names with relative location (e.g., building #1, building #2, first floor, second floor, etc.) into one group, names with direction (e.g., north, south, etc.) together into another sub-group and function names (e.g., lobby, cafeteria, fire door, etc.) into still another group. It should be noted that the groups are not mutually exclusive. For example, fire doors may exist on several floors.

Next, a processor may receive the device names and area names from the BIM and parse the names to find logical matches. The sensors matched with areas or regions of the BIM are placed (displayed) within these areas or regions of a geographic display (e.g., floor map) of the secured area. For example, if an access control door has been assigned a name of "first floor-north wing-access door" and a doors sensor has a name that is matched to that name, then the sensor is mapped into the corresponding region in the BIM geographic display.

Under a second part of the process, a user may add a display site to a sensor file and also a location site to the BIM for a first sensor device before adding any other devices. The sites may be linked by an identifier of a sensor. This allows activation information of the corresponding sensor to be coupled by an alarm processor to the geographic display and also for sensor information to be retrieved and displayed from the geographic display.

When display information is added to sensor file and to the BIM, the device is automatically placed in the corresponding region of the geographic display of the BIM. All the operator has to do is to map it into its exact door equivalent in the BIM.

For example, a sensor device (e.g., a fire sensor) may be mapped to a cafeteria on a first floor of the building. In response, a display processor may display an icon of a fire sensor in a region of the cafeteria on the floor plan of a graphical user interface (GUI) portion of the display. The user may map the fire sensor to its installed location by clicking on the fire sensor and dragging the senor to its exact, final location. In response, a location processor may save the coordinates of the final location in the BIM along with the system identifier of the sensor.

Figure 2:
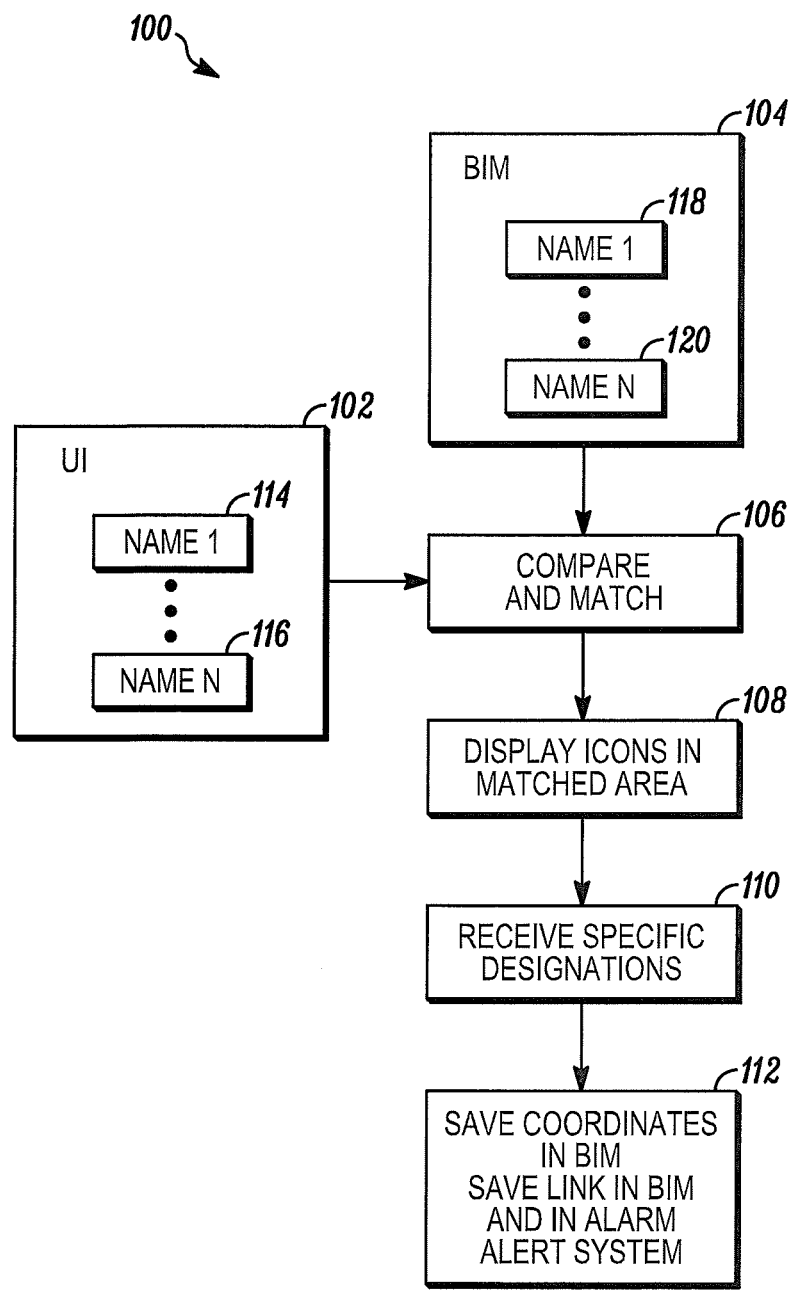
FIG. 2 depicts information flow among the processors of FIG. 1.

FIG. 2 provides a more detailed example of the processes 100 that occurs within one or more of the programmed processors described above. For example, the user interface 102 receives identifiers or names of each of the sensors from the user. The identifiers may be incorporated into one or more sensor files 114, 116. A comparison processor may receive or retrieve the sensor files from the user interface. The comparison processor may also retrieve one or more area files 118, 120 from the BIM. The area files include functional information about each area defined within the BIM. For example, the area files may include a functional description including text indicative of the function of the area (e.g., fire door, cafeteria, lobby, etc.).

The comparison processor compares 106 the descriptive text of the sensors with the function text of the BIM. For example, if the user includes a sensor with associated descriptive text indicating that it is a fire door sensor and the comparison processor finds a functional area named "fire door" within the BIM, then the comparison processor will match the fire doors sensor to the functional area named fire door.

This process is repeated until each of the sensors has been matched to a functional area within the BIM. For example, the user may have designated a first fire sensor with the text "lobby smoke detector" and a second sensor "cafeteria smoke detector." Another sensor may have been labeled "loading dock motion sensor."

Next, a display processor receives the matches and displays 108 the sensors as a respective icon within a geographic display (e.g., a floor plan) defined by the BIM. In the example above of the fire door, an icon of a door open sensor is displayed adjacent the fire door. In larger functional areas (e.g., a cafeteria, loading dock, etc.), the display processor may simply place the matched sensors in a center of the functional area.

It should be noted that in some cases, it may not be possible to match the name of a sensor with a functional area. This may be the case where the name of the sensor is mis-spelled or when a special purpose sensors are added. In this case, sensor that cannot be matched may be displayed along the margins of the floor plan to alert the user.

Once displayed, a location processor may monitor the GUI for rearrangement of the icons of specific sensors. For example, the user may place a cursor over a fire detector in a cafeteria area and drag the icon to the exact location of use (e.g., near a kitchen). The location processor may detect the location where the icon is deposited as in indication of the final, desired location of the sensor.

Once a final destination of the icon is detected, the display processor may transfer the final coordinates to a linking processor. The linking processor may save an image of the icon in the BIM along with the final coordinates of use of the sensor.

The linking processor may also save a set of links (e.g., hyperlinks) within the BIM and also within the alarm processor. The link within the BIM allows a user to place a cursor over the icon displayed on a floor plan and click on the icon to obtain information about the sensor represented by the icon. The link within the alarm processor allows the alarm processor to activate the display processor for display the floor plan in response to activation of the sensor where the activated sensor is shown as a flashing icon for the benefit of security guards.

In general, the automated method of using a BIM is a significant advance over prior methods. For example, under prior methods, a user would be required to drag and drop a sensor into the BIM file or floor plan. In addition, the user must manually associate the devices with BIM entities. In a secured area having numerous panel and/or devices, this process is laborious and expensive.

The system of registering sensors is applicable to a number of different types of system. Examples include closed circuit television (CCTV) systems, fire alarm systems (FAS) and building management systems (BMS) to name a few.

In general, the system implements a sensor display by executing a set of steps including a user input of a security system having a secured area receiving a respective name from the user for each of a plurality of security sensors of the security system, a processor of the security system matching each of the respective names to one of a plurality of respective names of sensor locations within a Building Information Model (BIM) of the secured area, the user input receiving from the user a specific designation of a corresponding location of each of the plurality of security sensors within a geographic coordinate system of the BIM, a processor of the security system correlating each of the respective names with the corresponding location of the security sensor within the BIM and a processor of the security system mapping each of the plurality of security sensors to a location within the BIM model based upon the name of the device.

The system includes a user input of a security system having a secured area that receives a respective name from the user for each of a plurality of security sensors of the security system, a processor of the security system that matches each of the respective names to one of a plurality of respective names of sensor locations within a Building Information Model (BIM) of the secured area, the user input that receives from the user a specific designation of a corresponding location of each of the plurality of security sensors within a geographic coordinate system of the BIM, a processor of the security system that correlates each of the respective names with the corresponding location of the security sensor within the BIM and a processor of the security system that maps each of the plurality of security sensors to a location within the BIM model based upon the name of the device.

Alternatively, the system includes a user input of a security system having a secured area that receives a respective name from the user for each of a plurality of security sensors of the security system, a processor of the security system that matches each of the respective names to one of a plurality of respective names of functional locations within a Building Information Model (BIM) of the secured area, a graphical user interface (GUI) that receives from the user a specific designation of a corresponding location of each of the plurality of security sensors within a geographic coordinate system of the BIM, a processor of the security system that correlates each of the respective names with the corresponding location of the security sensor within the BIM and a processor of the security system that maps each of the plurality of security sensors to a location within the BIM model based upon the name of the device.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
   a computer-readable memory storing a building information model (BIM) comprising a plurality of location names, wherein each of the plurality of location names corresponds to a respective one of a plurality of areas in a secured area;
   a user interface receiving from a user of the user interface a sensor name for a wireless security sensor of a security system, wherein the wireless security sensor has yet to be mapped on the BIM, and wherein the sensor name includes a plain language description of a location for the wireless security sensor;
   a processor of the security system configured to:
      use Natural Language Processing when matching the plain language description of the location for the wireless security sensor to one of the plurality of location names within the BIM; and
      identify a location in the BIM for the wireless security sensor as corresponding to the respective one of the plurality of areas in the secure area of the BIM that corresponds to the one of the plurality of location names within the BIM that matched the plain language description of the location for the wireless security sensor; and
   a display displaying a graphical element for the wireless security sensor within an image of the BIM at the respective one of the plurality of areas that corresponds to the one of the plurality of location names that matched the plain language description of the location for the wireless security sensor.

2. The method as in claim 1 wherein the image includes a map of at least part of the secured area from the BIM.

3. The method as in claim 2 further comprising displaying information to the user about the wireless security sensor through the user interface.

4. The method as in claim 1 further comprising:
   the user interface receiving a sensor search criteria; and
   the processor of the security system generating a map showing the location of at least one security sensor that corresponds to the sensor search criteria.

5. The method as in claim 1 wherein the image includes a floor plan.

6. The method as in claim 1 further comprising matching a first function identified by the sensor name with a second function of the respective one of the plurality of areas that corresponds to the one of the plurality of location names that matched the plain language description of the location for the wireless security sensor.

7. The method of claim 6 wherein the second function includes at least one of a fire exit, a lobby, a cafeteria, and a reception area.

8. The method as in claim 1 further comprising matching a multi-story building floor designation of the wireless security sensor with a floor designation of the BIM.

9. The method as in claim 8 further comprising displaying a floor plan of the BIM with the wireless security sensor displayed on the floor plan.

10. The method as in claim 9 further comprising the user interface receiving instructions for dragging the graphical element for of the wireless security sensor within the floor plan.

11. An apparatus comprising:
    a computer-readable memory that stores a building information model (BIM) comprising a plurality of location names, wherein each of the plurality of location names corresponds to a respective one of a plurality of areas in a secured area;

a user interface that receives from a user of the user interface a sensor name for a wireless security sensor of a security system, wherein the wireless security sensor has yet to be mapped on the BIM, and wherein the sensor name includes a plain language description of a location for the wireless security sensor;

a processor of the security system configured to:
    match the plain language description of the location for the wireless security sensor received by the user of the user interface to one of the plurality of location names within the BIM; and
    identify a location in the BIM for the wireless security sensor as corresponding to the respective one of the plurality of areas in the secure area of the BIM that corresponds to the one of the plurality of location names within the BIM that matched the plain language description of the location for the wireless security sensor; and a display that displays a graphical element for the wireless security sensor within an image of the BIM at the respective one of the plurality of areas that corresponds to the one of the plurality of location names that matches the plain language description of the location for the wireless security sensor.

12. The apparatus as in claim 11 wherein the plurality of location names includes functional locations.

13. The apparatus as in claim 12 wherein the functional locations include one or more of a fire exit, a lobby, a reception area, and a cafeteria.

14. The apparatus as in claim 11 wherein the user interface receives user input for dragging the graphical element for the wireless security sensor within the BIM.

15. The apparatus as in claim 14 wherein the processor of the security system displays the graphical element for the wireless security sensor as an icon.

16. The apparatus as in claim 15 wherein the image includes a floor plan of the secured area.

\* \* \* \* \*